United States Patent
Nath et al.

(10) Patent No.: US 11,458,967 B2
(45) Date of Patent: Oct. 4, 2022

(54) LANE-CENTERING ASSISTANCE

(71) Applicant: Ford Global Technologies, LLC, Dearborn, MI (US)

(72) Inventors: Nitendra Nath, Troy, MI (US); Steven Yellin Schondorf, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 346 days.

(21) Appl. No.: 16/507,402

(22) Filed: Jul. 10, 2019

(65) Prior Publication Data

US 2021/0009122 A1   Jan. 14, 2021

(51) Int. Cl.
| | |
|---|---|
| *B60W 30/12* | (2020.01) |
| *B60W 40/09* | (2012.01) |
| *G08G 1/16* | (2006.01) |
| *B60W 50/14* | (2020.01) |
| *G06V 20/56* | (2022.01) |

(52) U.S. Cl.
CPC ............ *B60W 30/12* (2013.01); *B60W 40/09* (2013.01); *B60W 50/14* (2013.01); *G06V 20/588* (2022.01); *G08G 1/167* (2013.01); *B60W 2050/143* (2013.01)

(58) Field of Classification Search
CPC ...... B60W 30/12; B60W 40/09; B60W 50/14; B60W 2050/143; G08G 1/167; G06K 9/00798
See application file for complete search history.

(56) References Cited

U.S. PATENT DOCUMENTS

| | | | |
|---|---|---|---|
| 9,483,059 B2 | 11/2016 | Caveney | |
| 10,274,955 B2* | 4/2019 | Eigel | B60W 10/184 |
| 2017/0057545 A1* | 3/2017 | Laur | B62D 15/0265 |
| 2017/0369058 A1 | 12/2017 | Van Dan Elzen et al. | |
| 2018/0022385 A1* | 1/2018 | Fu | B60W 10/20 701/41 |
| 2018/0037224 A1* | 2/2018 | Bogner | B60W 50/14 |
| 2018/0273089 A1* | 9/2018 | Isomoto | G08G 1/167 |
| 2018/0345964 A1 | 12/2018 | Fujii et al. | |
| 2019/0049972 A1* | 2/2019 | Prasad | B62D 15/025 |
| 2019/0232955 A1* | 8/2019 | Grimm | B60W 50/06 |

* cited by examiner

Primary Examiner — Fadey S. Jabr
Assistant Examiner — Omar K Morsy
(74) Attorney, Agent, or Firm — Frank A. MacKenzie; Bejin Bieneman PLC

(57) ABSTRACT

A vehicle control system includes a computer including a processor and a memory storing instruction executable by the processor to, in response to detecting hands being off a steering wheel for a threshold time while a lane-centering assist operation is active, steer a vehicle including the steering wheel from a center of a lane to a lateral position between the center of the lane and an edge of the lane; then steer the vehicle from the lateral position to the center of the lane; and then maintain the vehicle at the center of the lane.

16 Claims, 4 Drawing Sheets

LANE-CENTERING ASSISTANCE

BACKGROUND

Some vehicles are equipped with lane-centering assist systems. One or more forward-facing cameras can detect lane markings, which allows determination of the vehicle's position within the lane. A vehicle steering system is used to keep the vehicle at a center of the lane, i.e., to keep the vehicle equally spaced from an edge of the lane on either side of the vehicle. Because of other events that can occur while driving, a driver of the vehicle must still pay attention to the driving situation while the lane-centering assist is active.

DETAILED DESCRIPTION

Figure 1:
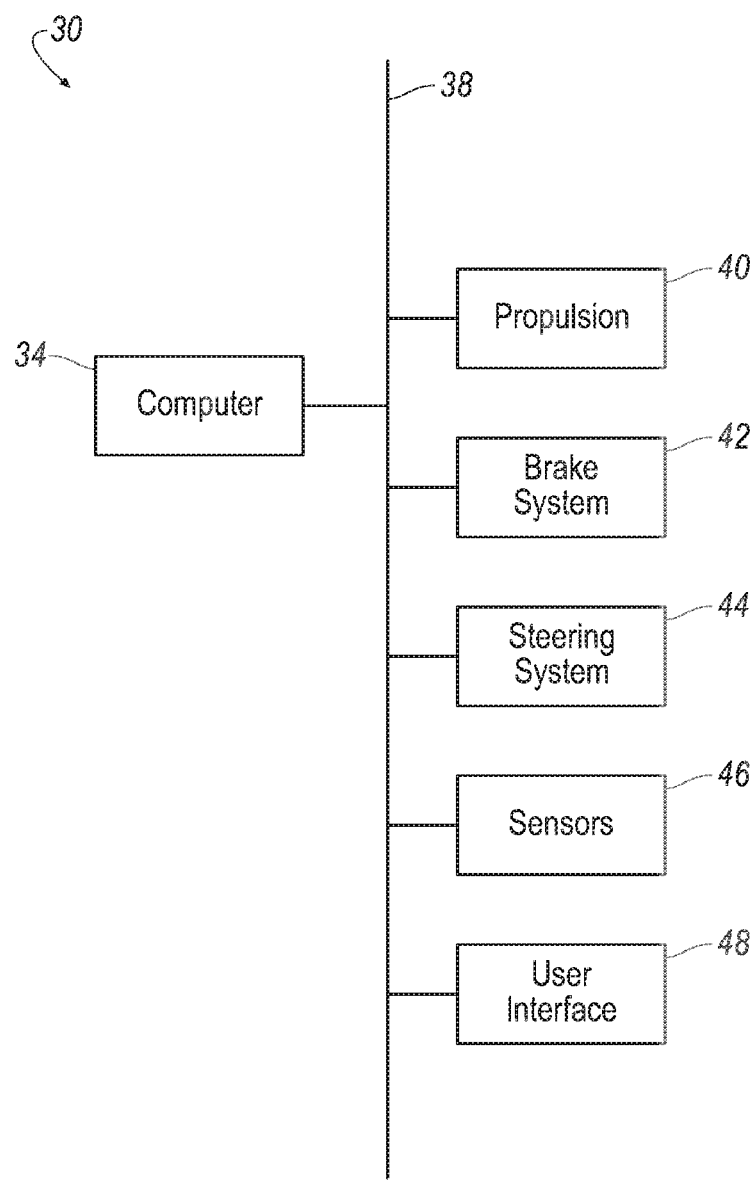
FIG. 1 is a block diagram of an example vehicle.

A vehicle control system includes a computer including a processor and a memory storing instructions executable by the processor to, in response to detecting hands being off a steering wheel of a vehicle for a threshold time while a lane-centering assist operation is active, steer the vehicle from a center of a lane to a lateral position between the center of the lane and an edge of the lane; then steer the vehicle from the lateral position to the center of the lane; and then maintain the vehicle at the center of the lane.

Steering the vehicle from the center of the lane to the lateral position may include generating a path along which a control module guides the vehicle. The path may be represented by a polynomial function. The polynomial function may be a function of a lookahead distance.

Generating the path may include generating a plurality of paths to a series of intermediate lateral positions between the center of the lane and the lateral position.

The instructions may further include to, while steering the vehicle from the center of the lane to the lateral position, refrain from outputting a warning to an occupant of the vehicle.

The instructions may further include to, while steering the vehicle from the lateral position to the center of the lane, refrain from outputting a warning to an occupant of the vehicle.

The instructions may further include to, while maintaining the vehicle at the center of the lane after steering the vehicle from the lateral position, output a warning to an occupant of the vehicle.

The instructions may further include to, in response to a hand on the steering wheel while steering the vehicle from the center of the lane to the lateral position, steer the vehicle to the center of the lane without reaching the lateral position.

A method includes, in response to detecting hands being off a steering wheel of a vehicle for a threshold time while a lane-centering assist operation is active, steering the vehicle from a center of a lane to a lateral position between the center of the lane and an edge of the lane; then steering the vehicle from the lateral position to the center of the lane; and then maintaining the vehicle at the center of the lane.

Steering the vehicle from the center of the lane to the lateral position may include generating a path along which a control module guides the vehicle. The polynomial function is a function of a lookahead distance.

Generating the path may include generating a plurality of paths to a series of intermediate lateral positions between the center of the lane and the lateral position.

The method may further include, while steering the vehicle from the center of the lane to the lateral position, refraining from outputting a warning to an occupant of the vehicle.

The method may further include, while steering the vehicle from the lateral position to the center of the lane, refraining from outputting a warning to an occupant of the vehicle.

The method may further include, while maintaining the vehicle at the center of the lane after steering the vehicle from the lateral position, outputting a warning to an occupant of the vehicle.

The method may further include, in response to a hand on the steering wheel while steering the vehicle from the center of the lane to the lateral position, steering the vehicle to the center of the lane without reaching the lateral position.

A vehicle control system includes means for detecting whether hands of an occupant are on a steering wheel of a vehicle; means for steering the vehicle to a lateral position in a lane; and a computer. The computer is programmed to, in response to detecting hands being off the steering wheel for a threshold time while a lane-centering assist operation is active, steer the vehicle from a center of the lane to the lateral position; then steer the vehicle from the lateral position to the center of the lane; and then maintain the vehicle at the center of the lane.

With reference to the Figures, a vehicle control system 32 for a vehicle 30 includes a computer 34 including a processor and a memory storing instructions executable by the processor to, in response to detecting hands being off a steering wheel 36 of the vehicle 30 for a threshold time while a lane-centering assist operation is active, steer the vehicle 30 from a center C of a lane L to a lateral position P between the center C of the lane L and an edge E of the lane L; then steer the vehicle 30 from the lateral position P to the center C of the lane L; and then maintain the vehicle 30 at the center C of the lane L.

The vehicle control system 32 provides a way to keep a driver of the vehicle 30 engaged while the lane-centering assist operation is active. The vehicle control system 32 can detect situations in which the occupant does have a hand on the steering wheel 36 but is not exerting torque on the steering wheel 36, e.g., driving on a long straightaway in which the steering wheel 36 is not moving relative to the occupant's hand, by performing a slight turn that can cause a nonzero torque from resistance by the occupant's hand if the occupant's hand is on the wheel. The vehicle control system 32 performs a steering maneuver that can prompt engagement by the occupant while feeling natural and nondisruptive to the occupant. The vehicle control system 32 can minimize warnings provided to occupant who is currently engaged with the driving situation.

With reference to FIG. 1, the vehicle 30 may be any passenger or commercial automobile such as a car, a truck, a sport utility vehicle, a crossover, a van, a minivan, a taxi, a bus, etc.

The computer 34 is a microprocessor-based controller. The computer 34 includes a processor, memory, etc. The memory of the computer 34 includes memory for storing instructions executable by the processor as well as for electronically storing data and/or databases.

The computer 34 may transmit and receive data through a communications network 38 such as a controller area network (CAN) bus, Ethernet, WiFi, Local Interconnect Network (LIN), onboard diagnostics connector (OBD-II), and/or by any other wired or wireless communications network. The computer 34 may be communicatively coupled to a propulsion 40, a brake system 42, a steering system 44, sensors 46, a user interface 48, and other components via the communications network 38.

The propulsion 40 of the vehicle 30 generates energy and translates the energy into motion of the vehicle 30. The propulsion 40 may be a conventional vehicle propulsion subsystem, for example, a conventional powertrain including an internal-combustion engine coupled to a transmission that transfers rotational motion to road wheels 50; an electric powertrain including batteries, an electric motor, and a transmission that transfers rotational motion to the road wheels 50; a hybrid powertrain including elements of the conventional powertrain and the electric powertrain; or any other type of propulsion. The propulsion 40 can include an electronic control unit (ECU) or the like that is in communication with and receives input from the computer 34 and/or a human driver. The human driver may control the propulsion 40 via, e.g., an accelerator pedal and/or a gearshift lever.

The brake system 42 is typically a conventional vehicle braking subsystem and resists the motion of the vehicle 30 to thereby slow and/or stop the vehicle 30. The brake system 42 may include friction brakes such as disc brakes, drum brakes, band brakes, etc.; regenerative brakes; any other suitable type of brakes; or a combination. The brake system 42 can include an electronic control unit (ECU) or the like that is in communication with and receives input from the computer 34 and/or a human driver. The human driver may control the brake system 42 via, e.g., a brake pedal.

The steering system 44 is typically a conventional vehicle steering subsystem and controls the turning of the road wheels 50. While the steering system 44 is described in more detail below with respect to FIG. 2 as a steer-by-wire system, the steering system 44 may instead be any other suitable steering system, e.g., a rack-and-pinion system with electric power-assisted steering, etc. The steering system 44 can include an electronic control unit (ECU) such as a power-steering control module 52 or the like that is in communication with and receives input from the computer 34 and/or a human driver. The human driver may control the steering system 44 via, e.g., the steering wheel 36.

The sensors 46 may provide data about operation of the vehicle 30, for example, wheel speed, wheel orientation, and engine and transmission data (e.g., temperature, fuel consumption, etc.). The sensors 46 may detect the location and/or orientation of the vehicle 30. For example, the sensors 46 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 46 may detect the external world, e.g., objects and/or characteristics of surroundings of the vehicle 30, such as other vehicles, road lane markings, traffic lights and/or signs, pedestrians, etc. For example, the sensors 46 may include radar sensors, scanning laser range finders, light detection and ranging (LIDAR) devices, and image processing sensors such as cameras. The sensors 46 may include communications devices, for example, vehicle-to-infrastructure (V2I) or vehicle-to-vehicle (V2V) devices.

The user interface 48 presents information to and receives information from an occupant of the vehicle 30. The user interface 48 may be located, e.g., on an instrument panel in a passenger cabin of the vehicle 30, or wherever may be readily seen by the occupant. The user interface 48 may include dials, digital readouts, screens, speakers, and so on for providing information to the occupant, e.g., human-machine interface (HMI) elements such as are known. The user interface 48 may include buttons, knobs, keypads, microphone, and so on for receiving information from the occupant.

Figure 2:
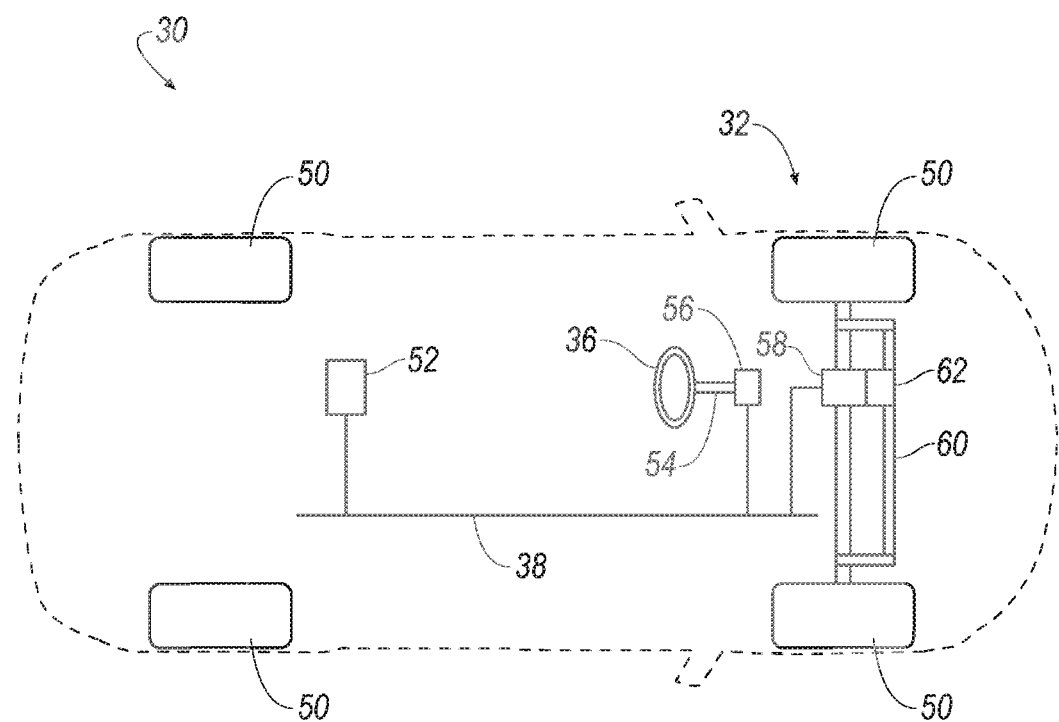
FIG. 2 is a diagram of an example steering system for the vehicle of FIG. 1.

With reference to FIG. 2, the steering wheel 36 allows an operator to steer. The steering wheel 36 may be, e.g., a rigid ring fixedly attached to a steering column 54. The steering column 54 may be, e.g., a shaft connecting the steering wheel 36 to a feedback actuator 56. The steering column 54 may house a clutch and one or more of the sensors 46 such as a torque sensor and/or a position sensor (not specifically shown) positioned to detect the orientation of the steering wheel 36. The position sensor may be, e.g., a Hall effect sensor, a rotary encoder, etc. The torque sensor and position sensor may be in communication with the power-steering control module 52 via the communications network 38.

The power-steering control module 52 may output a signal to a steering motor 58 via the communications network 38. The steering motor 58 may be one or more electromechanical actuators, e.g., an electric motor, coupled to a steering rack 60, or otherwise turnably coupled to the road wheels 50, and the steering motor 58 may transform the signal into mechanical motion of the steering rack 60 and/or turning of the road wheels 50. The steering rack 60 may be turnably coupled to the road wheels 50, for example, in a four-bar linkage. The position of the steering rack 60 determines the turning of the road wheels 50. Translational motion of the steering rack 60 results in turning of the road wheels 50. The steering motor 58 may be coupled to the steering rack 60 via a rack and pinion 62, that is, gear meshing between a pinion gear and a rack gear (not specifically shown).

The feedback actuator 56 applies a torque to the steering column 54 to provide feedback to the operator. The feedback actuator 56 may be, e.g., an electric motor rotatably coupled to the steering column 54. The feedback actuator 56 may apply torque with a value chosen to simulate torque feedback from a conventional steering system, e.g., based on steering angle and vehicle speed. If the vehicle 30 is operating autonomously, the feedback actuator 56 may apply torque to rotate the steering wheel 36 to a steering-wheel angle related to the steering angle of the vehicle 30, e.g., by a steering ratio. The feedback actuator 56 is in communication with the power-steering control module 52.

The sensors 46 provide data about components of the steering system 44 to the power-steering control module 52 and/or the computer 34. For example, the sensors 46 include wheel-speed sensors for the road wheels 50; position and/or inertial sensors on components of the steering system 44 such as the steering wheel 36, the steering column 54, the rack and pinion 62, or the steering rack 60; torque sensors on components of the steering system 44 such as the steering column 54, the rack and pinion 62, the steering motor 58, or the feedback actuator 56; and voltage or current sensors on terminals of the steering motor 58 or feedback actuator 56.

Figure 3:
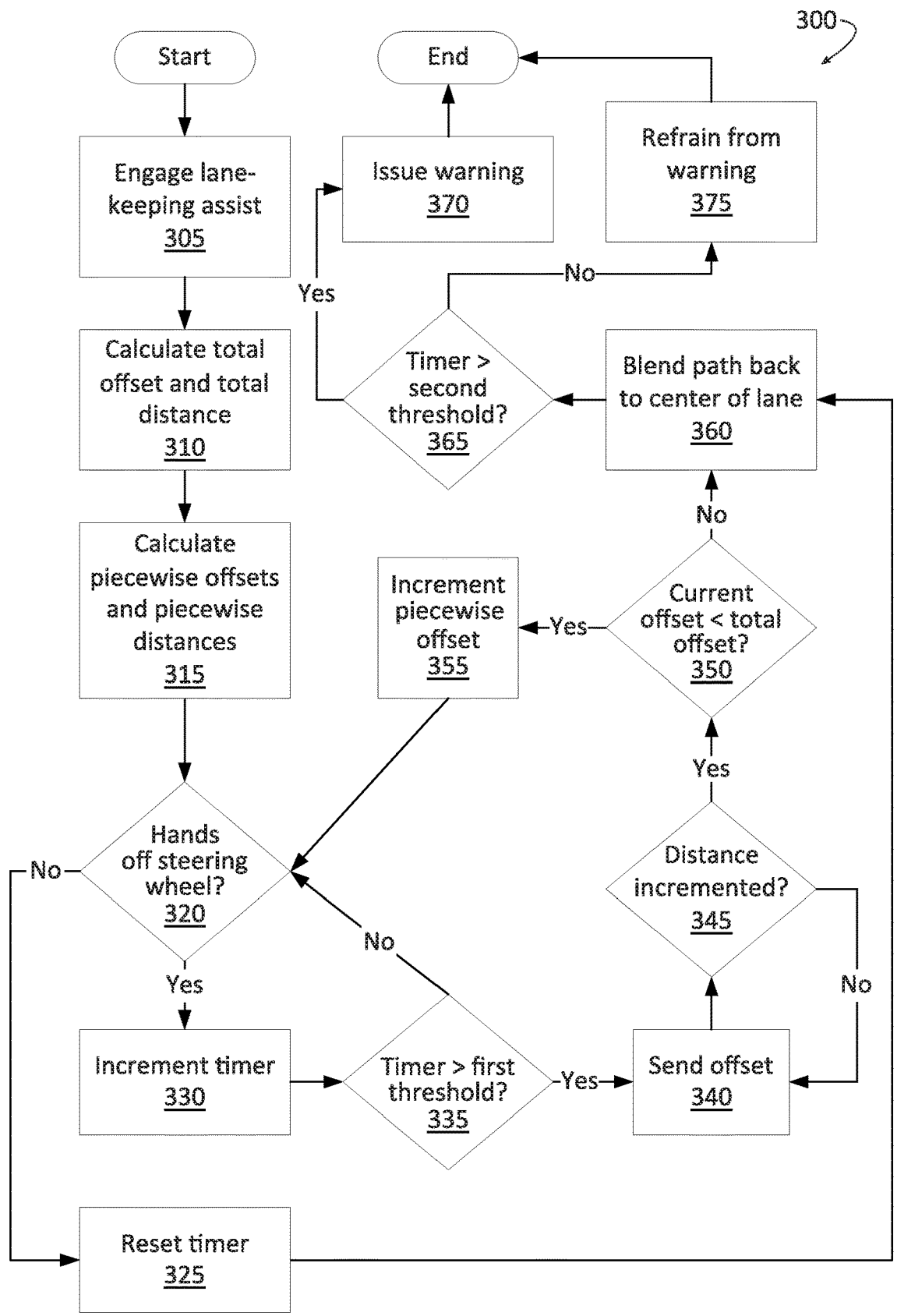
FIG. 3 is a process flow diagram of an example process for controlling the steering system of the vehicle while a lane-centering assist operation is active.

FIG. 3 is a process flow diagram illustrating an exemplary process 300 for controlling the steering system 44 of the vehicle 30 while a lane-centering assist operation is active.

The memory of the computer 34 stores executable instructions for performing the steps of the process 300. As a general overview of the process 300, while a lane-centering assist operation is active, the computer 34 steers the vehicle 30 from the center C of the lane L to a lateral position P starting in response to detecting hands being off the steering wheel 36 for a first threshold time, then steers the vehicle 30 back to the center C of the lane L, interrupts the steering action to the lateral position P and steers the vehicle 30 back to the center C of the lane L in response to detecting hands being on the steering wheel 36, and issues a warning in response to detecting hands being off the steering wheel 36 for a second threshold time. To steer from the center C of the lane L to the lateral position P, the computer 34 generates a plurality of incremental polynomial paths of relatively short length rather than one polynomial path all the way to the lateral position P.

The process 300 begins in a block 305, in which a lane-centering assist operation is active. The lane-centering assist operation is software running on the computer 34, the power-steering control module 52, and/or another control module to steer the vehicle 30 so as to maintain a lateral position of the vehicle 30 within a lane L at a center C of the lane L without input from a human driver. For example, the computer 34 can receive input from the sensors 46 specifying the position of lane markings up to a lookahead distance (defined below), generate a mathematical function defining a path (specifically, a path polynomial) for the vehicle 30 to follow to stay centered in the lane L according to conventional algorithms, and send the function to the power-steering control module 52, and the power-steering control module 52 can instruct the steering motor 58 to turn the road wheels 50 so as to follow the path.

Next, in a block 310, the computer 34 determines the lateral position P by calculating a total distance $x_{tot}$ and a total lateral offset $y_{tot}$. The total distance $x_{tot}$ is the forward distance that the vehicle 30 travels to reach the lateral position P from a starting position S, and the total lateral offset $y_{tot}$ is the lateral distance that the vehicle 30 travels to reach the lateral position P from the starting position S. In other words, the lateral position P is a position with coordinates ($x_{tot}$, $y_{tot}$) relative to the starting position S. "Forward" and "lateral" directions are determined with respect to the lane L. The total distance $x_{tot}$ is a lookahead distance, i.e., a maximum distance at which the vehicle 30 can respond. The total distance $x_{tot}$ is a minimum of a current maximum forward distance $x_{vision}$ for which the sensors 46 have an unobstructed view of the environment, and an absolute maximum forward distance $x_{abs}$, i.e., $x_{tot}$=min ($x_{vision}$, $x_{abs}$). The current maximum forward distance $x_{vision}$ can be determined dynamically based on data from forward-looking sensors 46, e.g., as the distance to an object in a forward direction blocking a field of view in that direction. The absolute maximum forward distance $x_{abs}$ is a distance corresponding to a maximum time $t_{abs}$ to steer the vehicle 30 to the lateral position P and back to the center C of the lane L, which is a function of speed, e.g., $x_{abs}$=v·$t_{abs}$, in which v is a current vehicle speed. The maximum time $t_{abs}$ is a constant value stored in memory and can be based on, e.g., regulations about warning occupants to place hands on the steering wheel 36 while the lane-centering assist operation is active. The absolute maximum forward distance $x_{abs}$ can thus be calculated dynamically based on the speed v. The total lateral offset $y_{tot}$ is the lateral distance from the center C of the lane L of the vehicle 30 (as measured from the center of the vehicle 30) at the lateral position P. The total lateral offset $y_{tot}$ is based on a prestored clearance c of a nearer side of the vehicle 30 from the edge E of the lane L, e.g., $y_{tot}$=0.5·$w_{lane}$−0.5·$w_{vehicle}$−c, in which $w_{lane}$ is the width of the lane L and $w_{vehicle}$ is the width of the vehicle 30. The clearance c can be chosen to make the maneuver easily noticeable to the driver while making it unlikely that the vehicle 30 will leave the lane L, i.e., cross the edge E of the lane L.

Next, in a block 315, the computer 34 generates a path that the vehicle 30 will follow from the starting position S to the lateral position P. The path is represented by a polynomial function (hence referred to as a path polynomial), e.g., $y(x)=a_0+a_1x+a_2x^2+a_3x^3$, in which y is the lateral distance of the center of the vehicle 30 from the center C of the lane L; x is the forward distance of the vehicle 30; and $a_0$, $a_1$, $a_2$, and $a_3$ are coefficients for the polynomial. The coefficient $a_0$ is a lateral offset of the vehicle 30 from the center C of the lane L, the coefficient $a_1$ is a heading of the vehicle 30 relative to the lane L, the coefficient $a_2$ is a curvature of the center C of the lane L, and the coefficient $a_3$ is a rate of curvature of the center C of the lane L. The computer 34 divides the total distance $x_{tot}$ into a plurality of increments or segments i of length $x_i$, in which i is an index of the segment starting at the starting position S and ending at the lateral position P. For example, segment 1 begins at the starting position S and ends at a distance $x_1$ from the starting position S, segment 2 begins at the distance $x_1$ from the starting position S and ends at a distance $x_1+x_2$ from the starting position S, and so on. The lengths $x_i$ of the segments i can be determined based on how smoothly an occupant will experience the ride of the vehicle 30 as the segments are traversed and the coefficients are transmitted to the power-steering control module 52 to steer the vehicle 30 to the lateral position P, as described below. The lengths $x_i$ can each be a prestored distance or can be determined based on a prestored time $t_i$, e.g., $x_i$=v·$t_i$, in which v is the current vehicle speed. The computer 34 determines the coefficients $a_{0\_i}$, $a_{1\_i}$, $a_{2\_i}$ and $a_{3\_i}$ for each segment i. The coefficients $a_{2\_i}$ and $a_{3\_i}$ are the actual curvature and rate of curvature of the center C of the lane L at the segment i, as determined from data from the sensors 46. The coefficient $a_{1\_i}$ is the angle in radians from the center C of the lane L to the lateral position P, i.e., $a_{1\_i}$=arctan($y_{tot}/x_{tot}$), which is the same for each segment i. The coefficient $a_{0\_i}$ is the covered distance from the starting position S multiplied by the tangent of the coefficient $a_{1\_i}$, i.e., $a_{0\_i}$=($x_1$+ . . . +$x_i$)·tan $a_{1\_i}$. The coefficients $a_{0\_i}$, $a_{1\_i}$, $a_{2\_i}$, and $a_{3\_i}$ for each segment i are stored in the memory of the computer 34, along with a variable for tracking the segment i in which the vehicle 30 is currently located.

Next, in a decision block 320, the computer 34 detects whether at least one hand is on the steering wheel 36. For example, the computer 34 can receive data indicating a current torque from torque sensors of the sensors 46 on the steering wheel 36 or steering column 54, and the computer 34 can determine whether the torque is above a torque threshold. The torque threshold can be chosen to be above zero and below a least detectable torque that an occupant could apply to the steering wheel 36 with their hand. For another example, the computer 34 can use data from capacitive sensors of the sensors 46. If one or more hands is detected on the steering wheel 36, the process 300 proceeds to a block 325. If the hands are detected to be off the steering wheel 36, the process 300 proceeds to a block 330.

In the block 325, the computer 34 resets a timer to zero. The timer is to track the duration of no hands being detected on the steering wheel 36. After the block 325, the process proceeds to a block 360 to steer back to the center C of the lane L if the vehicle 30 is not already there.

In the block 330, the computer 34 increments the timer to the next time step, i.e., lets the timer track the time.

Next, in a decision block 335, the computer 34 determines whether the timer has exceeded a first threshold time. The first threshold time is chosen to be a time for which it is reasonable for an occupant to not have their hands on the steering wheel 36 while still having attention focused on driving the vehicle 30, e.g., as established by empirical testing. If the timer has not yet reached the first threshold time, the process 300 returns to the decision block 320 to detect whether the occupant has placed a hand back on the steering wheel 36. If the timer has exceeded the first threshold time, the process 300 proceeds to a block 340.

In the block 340, the computer 34 sends the coefficients $a_{0\_i}$, $a_{1\_i}$, $a_{2\_i}$, and $a_{3\_i}$ for the current segment i to the power-steering control module 52, and the power-steering control module 52 controls the steering system 44 to steer the vehicle 30 along the path defined by the polynomial function with the coefficients $a_{0\_i}$, $a_{1\_i}$, $a_{2\_i}$, and $a_{3\_i}$. Instructing the power-steering control module 52 to follow each segmental path one at a time, rather than instructing the power-steering control module 52 in a single step to guide the vehicle 30 along a single path to the lateral position P, can make the steering maneuver feel smoother and more natural to the occupant while still catching the attention of the occupant.

Next, in a decision block 345, the computer 34 determines whether the vehicle 30 has traveled from one segment i to the next segment i. The computer 34 can use, e.g., GPS data of the location of the vehicle 30 to determine if the vehicle 30 has exceeded a distance $x_1 + \ldots + x_i$ from the starting position S. If the vehicle 30 has not traveled to the next segment i, the process 300 returns to the block 340 for the power-steering control module 52 to continue steering the vehicle 30 according to the coefficients for the current segment i. If the vehicle 30 has traveled to the next segment i, the process 300 proceeds to a decision block 350.

In the decision block 350, the computer 34 determines whether the vehicle 30 has reached the lateral position P. For example, the computer 34 can determine the current lateral offset y of the vehicle 30 from the center C of the lane L is less than or has reached the total lateral offset $y_{tot}$. If the vehicle 30 has not yet reached the lateral position P, the process 300 proceeds to a block 355. If the vehicle 30 has reached the lateral position P, the process 300 proceeds to a block 360.

In the block 355, the computer 34 updates the variable representing the current segment i to the next segment i+1. After the block 355, the process 300 returns to the decision block 320 to detect whether the occupant has placed their hands back on the steering wheel 36.

In the block 360, the computer 34 generates a path from a current position of the vehicle 30 blending the vehicle 30 back to the center C of the lane L, and the computer 34 sends the path to the power-steering control module 52. The power-steering control module 52 controls the steering system 44 to steer the vehicle 30 along the path back to the center C of the lane L. If the occupant has not detectably placed a hand on the steering wheel 36 from the timer starting to the vehicle 30 reaching the lateral position P (i.e., if the process 300 proceeded to the block 360 from the block 350), then the power-steering control module 52 steers the vehicle 30 from the lateral position P to the center C of the lane L. If the occupant detectably placed a hand or hands back on the steering wheel 36 before the vehicle 30 reached the lateral position P (i.e., if the process proceeded to the block 360 from the block 325), then the power-steering control module 52 steers the vehicle 30 to the center C of the lane L without having reached the lateral position P. Once the vehicle 30 has returned to the center C of the lane L, the computer 34 maintains the vehicle 30 at the center C of the lane L, e.g., using the lane-centering assist operation.

Next, in a block 365, the computer 34 determines whether the timer has exceeded a second threshold time. The second threshold time is chosen to occur only after the vehicle 30 has reached the lateral position P and to warn an occupant to put their hands on the steering wheel 36 within, e.g., a timeframe based on government regulations. If the timer has exceeded the second threshold time, then the process 300 proceeds to a block 370. If the timer is less than the second threshold time, then the process 300 proceeds to a block 375.

In the block 370, the computer 34 instructs the user interface 48 to output a warning to the occupant. The warning can be visual, auditory, haptic, or a combination of the three. For example, the user interface 48 can emit a beep and display a graphic of hands on a steering wheel 36. No such warning is provided before reaching the block 370. The computer 34 refrains from outputting a warning to the occupant while steering the vehicle 30 from the center C of the lane L toward and to the position and while steering the vehicle 30 from the lateral position P or other position to the center C of the lane L. After the block 370, the process 300 ends.

In the block 375, the computer 34 refrains from outputting a warning to the occupant. Thus, no warning besides the steering maneuver has been provided to the occupant during the process 300. After the block 375, the process 300 ends.

Figure 4:
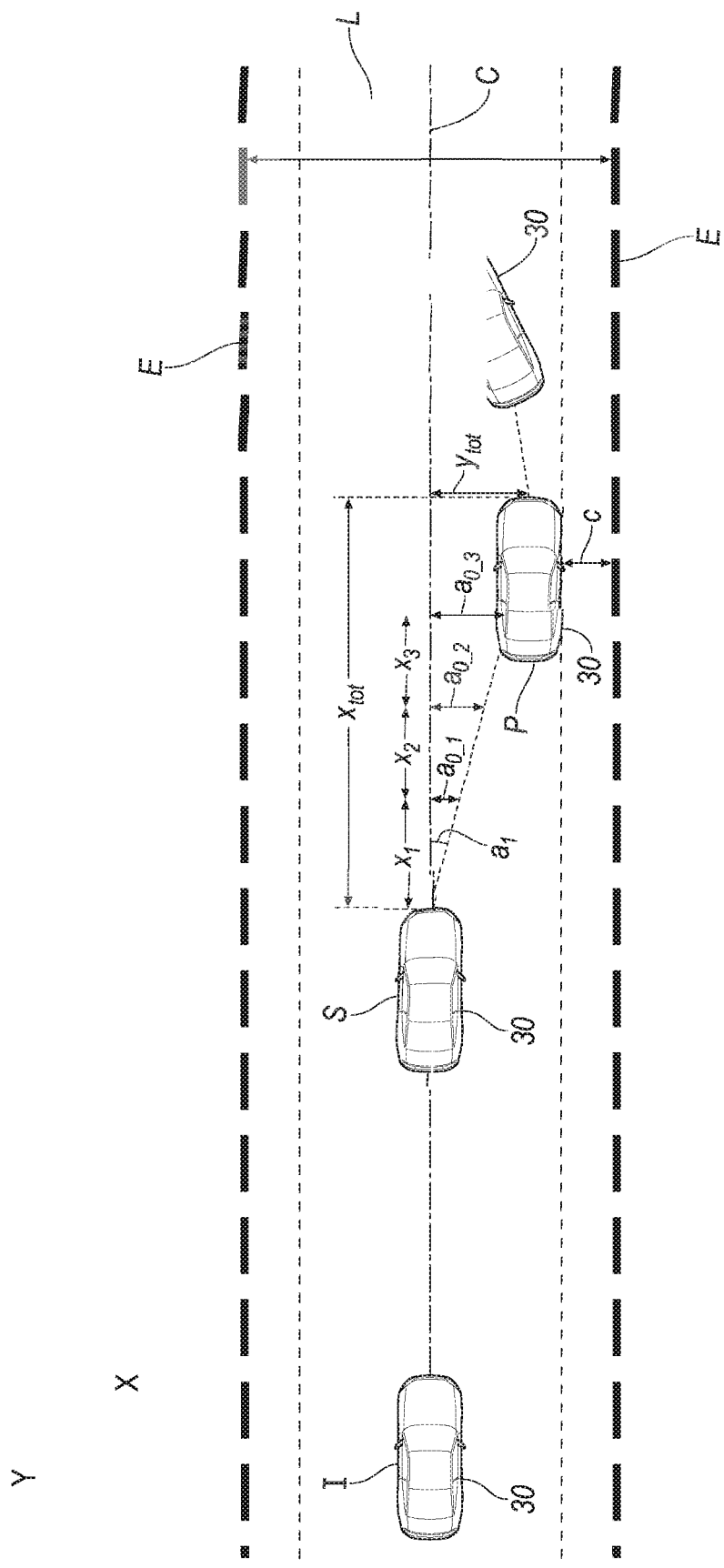
FIG. 4 is a diagram of example vehicle motion during the process of FIG. 3.

FIG. 4 is a diagram of possible motion of the vehicle 30 while following the process 300. For example, the occupant may remove their hands from the steering wheel 36 with the vehicle 30 in an initial position I. The lane-centering assist operation steers the vehicle straight along the center C of the lane L to the starting position S, at which the timer has exceeded the first threshold time. Supposing that the occupant does not return a hand or hands to the steering wheel 36, the computer 34 steers the vehicle 30 from the starting position S to the lateral position P, at which the center of the vehicle 30 is a distance $y_{tot}$ from the center C of the lane L and the side of the vehicle 30 is a distance c from the edge E of the lane L. The computer 34 then steers the vehicle 30 back toward the center C of the lane L.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first" and "second" are used throughout this document as identifiers and are not intended to signify importance, order, or quantity.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle control system comprising a computer comprising a processor and a memory storing instructions executable by the processor to:
    in response to detecting hands being off a steering wheel of a vehicle for a threshold time while a lane-centering assist operation is active, steer the vehicle along a generated path from a center of a lane to a lateral position between the center of the lane and an edge of the lane;
    then steer the vehicle from the lateral position to the center of the lane; and
    then maintain the vehicle at the center of the lane;
    wherein, from a time of detecting the hands being off the steering wheel to a time of maintaining the vehicle at the center of the lane, steering the vehicle away from the center of the lane occurs a single time; and
    the path is represented by a polynomial function of a lookahead distance.

2. The vehicle control system of claim 1, wherein steering the vehicle from the center of the lane to the lateral position includes generating the path along which a control module guides the vehicle.

3. The vehicle control system of claim 2, wherein generating the path includes generating a plurality of paths to a series of intermediate lateral positions between the center of the lane and the lateral position.

4. The vehicle control system of claim 1, wherein the instructions further include to, while steering the vehicle from the center of the lane to the lateral position, refrain from outputting a warning to an occupant of the vehicle.

5. The vehicle control system of claim 1, wherein instructions further include to, while steering the vehicle from the lateral position to the center of the lane, refrain from outputting a warning to an occupant of the vehicle.

6. The vehicle control system of claim 1, wherein the instructions further include to, while maintaining the vehicle at the center of the lane after steering the vehicle from the lateral position, output a warning to an occupant of the vehicle.

7. The vehicle control system of claim 1, wherein the instructions further include to, in response to a hand on the steering wheel while steering the vehicle from the center of the lane to the lateral position, steer the vehicle to the center of the lane without reaching the lateral position.

8. The vehicle control system of claim 1, wherein the instructions further include to determine the lateral position before steering the vehicle from the center of the lane to the lateral position.

9. A method comprising:
- in response to detecting hands being off a steering wheel of a vehicle for a threshold time while a lane-centering assist operation is active, steering the vehicle along a generated path from a center of a lane to a lateral position between the center of the lane and an edge of the lane;
- then steering the vehicle from the lateral position to the center of the lane; and
- then maintaining the vehicle at the center of the lane;
- wherein, from a time of detecting the hands being off the steering wheel to a time of maintaining the vehicle at the center of the lane, steering the vehicle away from the center of the lane occurs a single time; and
- the path is represented by a polynomial function of a lookahead distance.

10. The method of claim 9, wherein steering the vehicle from the center of the lane to the lateral position includes generating the path along which a control module guides the vehicle.

11. The method of claim 10, wherein generating the path includes generating a plurality of paths to a series of intermediate lateral positions between the center of the lane and the lateral position.

12. The method of claim 9, further comprising, while steering the vehicle from the center of the lane to the lateral position, refraining from outputting a warning to an occupant of the vehicle.

13. The method of claim 9, further comprising, while steering the vehicle from the lateral position to the center of the lane, refraining from outputting a warning to an occupant of the vehicle.

14. The method of claim 9, further comprising, while maintaining the vehicle at the center of the lane after steering the vehicle from the lateral position, outputting a warning to an occupant of the vehicle.

15. The method of claim 9, further comprising, in response to a hand on the steering wheel while steering the vehicle from the center of the lane to the lateral position, steering the vehicle to the center of the lane without reaching the lateral position.

16. A vehicle control system comprising:
- means for detecting whether hands of an occupant are on a steering wheel of a vehicle;
- means for steering the vehicle to a lateral position in a lane; and
- a computer programmed to,
  - in response to detecting hands being off the steering wheel for a threshold time while a lane-centering assist operation is active, steer the vehicle along a generated path from a center of the lane to the lateral position;
  - then steer the vehicle from the lateral position to the center of the lane; and
  - then maintain the vehicle at the center of the lane;
- wherein, from a time of detecting the hands being off the steering wheel to a time of maintaining the vehicle at the center of the lane, steering the vehicle away from the center of the lane occurs a single time; and
- the path is represented by a polynomial function of a lookahead distance.

\* \* \* \* \*